US008930235B2

(12) United States Patent
Mihic et al.

(10) Patent No.: US 8,930,235 B2
(45) Date of Patent: Jan. 6, 2015

(54) SHELF SPACE PRODUCT PLACEMENT OPTIMIZER

(71) Applicant: Oracle International Corporation, Redwood Shores, CA (US)

(72) Inventors: Kresimir Mihic, San Diego, CA (US); Andrew Vakhutinsky, Norwood, MA (US); David Vengerov, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 145 days.

(21) Appl. No.: 13/673,347

(22) Filed: Nov. 9, 2012

(65) Prior Publication Data

US 2013/0275277 A1    Oct. 17, 2013

Related U.S. Application Data

(60) Provisional application No. 61/625,366, filed on Apr. 17, 2012.

(51) Int. Cl.
| G06Q 10/00 | (2012.01) |
| G06Q 10/06 | (2012.01) |
| G06Q 10/04 | (2012.01) |
| G06Q 30/06 | (2012.01) |

(52) U.S. Cl.
CPC .......... *G06Q 10/06313* (2013.01); *G06Q 10/04* (2013.01); *G06Q 30/06* (2013.01)
USPC ...................................................... 705/7.29

(58) Field of Classification Search
None
See application file for complete search history.

(56) References Cited

U.S. PATENT DOCUMENTS

| 7,092,896 B2 * | 8/2006 | Delurgio et al. ............. 705/7.35 |
| 2003/0204474 A1 * | 10/2003 | Capek et al. .................... 705/64 |

OTHER PUBLICATIONS

NPL_GAMS, General Algebraic Modeling System, Wikipedia, downloaded on Jul. 20, 2014, 4 pages.*

(Continued)

*Primary Examiner* — Paul Danneman
(74) *Attorney, Agent, or Firm* — Miles & Stockbridge P.C.

(57) ABSTRACT

A system for optimizing shelf space placement for a product receives decision variables and constraints, and executes a Randomized Search ("RS") using the decision variables and constraints until an RS solution is below a pre-determined improvement threshold. The system then solves a Mixed-Integer Linear Program ("MILP") problem using the decision variables and constraints, and using the RS solution as a starting point, to generate a MILP solution. The system repeats the RS executing and MILP solving as long as the MILP solution is not within a predetermined accuracy or does not exceed a predetermined time duration. The system then, based on the final MILP solution, outputs a shelf position and a number of facings for the product.

20 Claims, 10 Drawing Sheets

(56) References Cited

OTHER PUBLICATIONS

ISO intelligent store optimization; "Galleria's Latest Solution Provides Fast, Seamless Optimization and Management of Store specific Space"; http://www.aldata.com/com/resources/details/space-planning; last downloaded on Nov. 9, 2012.

Aldata Space Optimization; "Optimize Retail Space with Aldata Space Optimization"; http://www.galleria-rts.com/images/stories/Downloads/iso.pdf; last downloaded on Nov. 9, 2012.

M. Corstjens et al.; "A Model for Optimizing Retail space Allocations"; Management Science; vol. 27 No. 7; Jul. 1981; pp. 822-833.

A. Hübner et al.; "Quantitative Models for Retail Category Management: A Review of Assortment and Shelf Space Planning in Practice, Software Applications and Science Working Paper"; Catholic University of Eichstätt-Ingolstadt; Feb. 1, 2011; pp. 1-27.

C. Murray et al.; "Joint Optimization of Product Price, Display Orientation and shelf-space allocation in Retail Category Management"; Journal of Retailing Manuscript # MS 2008-MRP-014; Feb. 12, 2010; pp. 1-36.

* cited by examiner

SHELF SPACE PRODUCT PLACEMENT OPTIMIZER

CROSS REFERENCE TO RELATED APPLICATIONS

This application claims priority of Provisional Patent Application Ser. No. 61/625,366, filed on Apr. 17, 2012, the contents of which is hereby incorporated by reference.

FIELD

One embodiment is directed generally to a computer system, and in particular to a computer system that optimizes retail shelf space product placement.

BACKGROUND INFORMATION

"Facings" in the retail industry refers to the amount of shelf space a particular product is given. A lot of facing generally increases sales of a particular product, and frequently manufacturers will pay more money to get more facings for their products. This inevitably leads to situations where the largest manufacturers end up with the most amount of facings because they are able to pay the most.

In conjunction with facing determinations for retail products, efficient allocation of shelf space and product assortment can significantly improve a retailer's profitability. A retail shelf space optimization problem in general is the problem of finding the optimal placement of merchandise items on the shelves to maximize one of many potential key performance indicators ("KPI"), such as revenue, profit or sales volume, by deciding where to place an item and how many facings to allocate subject to business and operation constraints.

The shelf space optimization problem can be considered a micro-space optimization problem in that it is the problem of creating a planogram ("POG") for a given retail category within given physical space. A POG is a diagram or model that indicates the placement of retail products on shelves in order to maximize sales

SUMMARY

One embodiment is a system for optimizing shelf space placement for a product. The system receives decision variables and constraints, and executes a Randomized Search ("RS") using the decision variables and constraints until an RS solution is below a pre-determined improvement threshold. The system then solves a Mixed-Integer Linear Program ("MILP") problem using the decision variables and constraints, and using the RS solution as a starting point, to generate a MILP solution. The system repeats the RS executing and MILP solving as long as the MILP solution is not within a predetermined accuracy or does not exceed a predetermined time duration. The system then, based on the final MILP solution, outputs a shelf position and a number of facings for the product.

DETAILED DESCRIPTION

One embodiment optimizes shelf space placement by alternating between a randomized search ("RS") heuristic and solving a Mixed-Integer Linear Program ("MILP") in order to determine, for a retail item, which shelf the item should be assigned and the number of its facings. The determination maximizes at least one of a key performance indicator ("KPI"), such as revenue, profit or sales volume.

Figure 1:
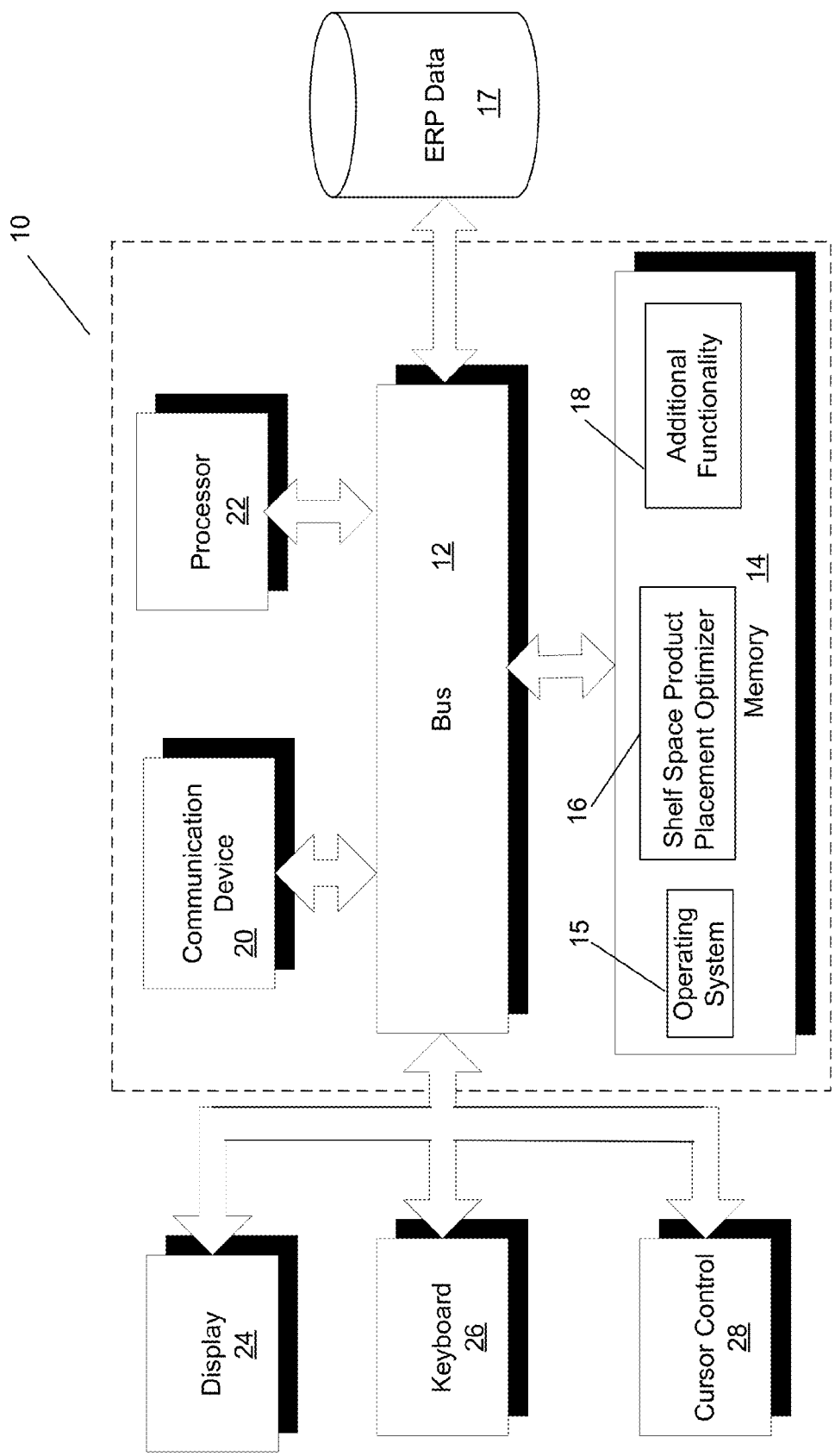
FIG. 1 is a block diagram of a computer system that can implement an embodiment of the present invention.

FIG. 1 is a block diagram of a computer system 10 that can implement an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22.

The modules include an operating system 15 that provides operating system functionality for system 10. The modules further include a shelf space product placement optimization module 16 that generates optimized shelf space product placement for retail products, as disclosed in more detail below. System 10 can be part of a larger system, such as an enterprise resource planning ("ERP") system. Therefore, system 10 will typically include one or more additional functional modules 18 to include the additional functionality. A database 17 is coupled to bus 12 to provide centralized storage for modules 16 and 18 and store pricing information, inventory information, ERP data, etc.

In one embodiment, system 10 receives a set of merchandise items (i.e., a planogram ("POG") category) in a selected store area (e.g., an aisle or department) defined by the area fixtures, item attributes and demand as a function of the number of facings and location. Given the item set positioned in the specific area of a particular store, the main objective is to determine location and the number of facings for each item that would maximize certain KPI parameters, such as total revenue, profit, or sales volume subject to the total shelf capacity, and certain item placement and assortment rules.

Figure 2A:
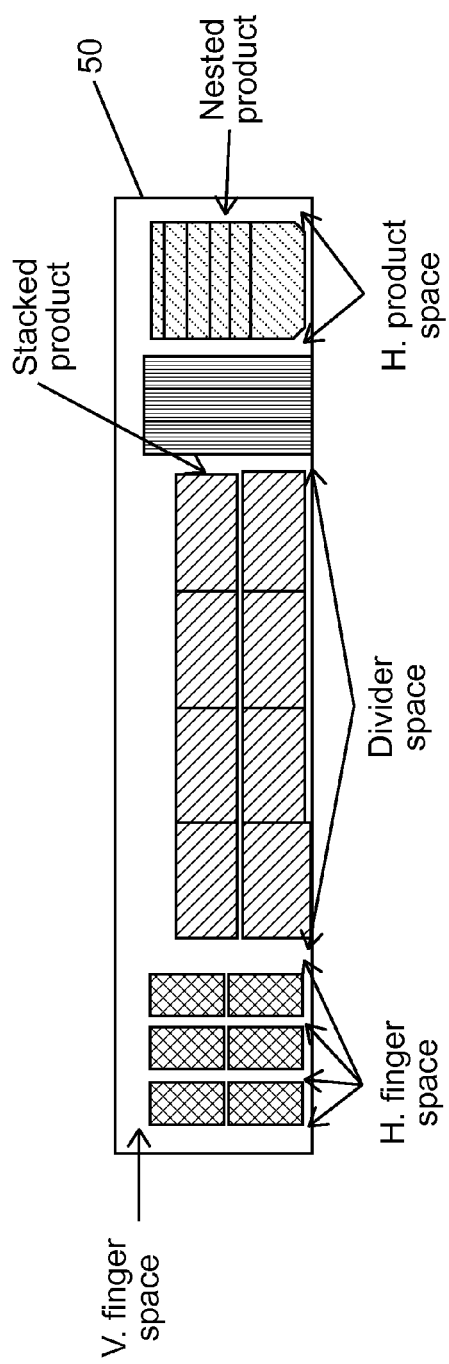
FIG. 2*a* illustrates an example retail shelf and various ways that an item can be placed on the shelf.

FIG. 2a illustrates an example retail shelf 50 and various ways that an item can be placed on shelf 50. One embodiment assumes that each item can be placed on one of several allowed shelves with certain number of allowed facings or completely taken out of the assortment. The embodiment also assumes that there is sales volume associated with each item, which is a given or pre-computed function of its number of facings and the shelf the item is assigned to. When an item is out of assortment, its associated KPI of interest may still be positive due to demand transference effect. Each item is assumed to have a single given orientation and a given way of its shelf storage, as illustrated by the possible parameters of an item placement in FIG. 2a.

Figure 2B:
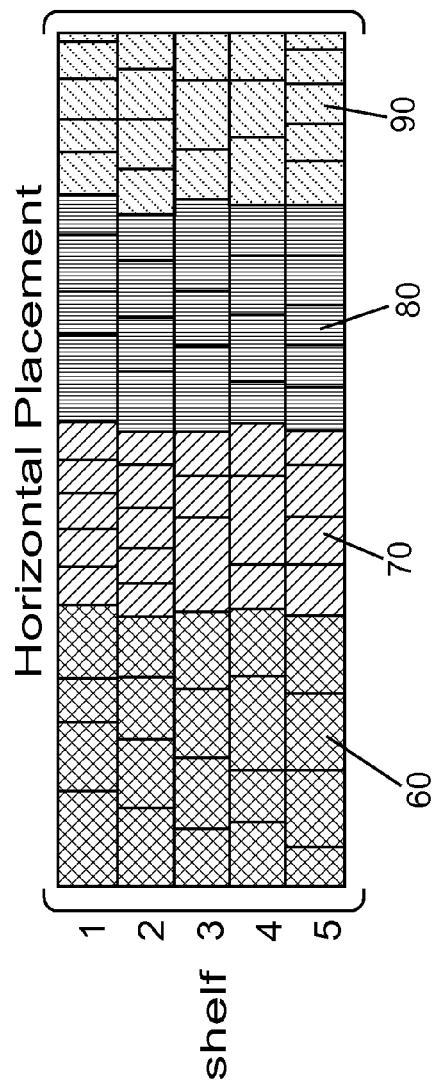
FIG. 2*b* illustrates example retail shelves and an example of vertical blocking between various brands.

Further, in one embodiment each item may have one or two attributes determining its placement rules. One attribute (e.g., the brand of the item) is referred to as the "vertical blocking attribute" and determines the vertical boundaries between groups of items with the same attribute value (i.e., vertical blocking between different brands). These boundaries are defined within some given tolerance. FIG. 2b illustrates example retail shelves 1-5 and an example of vertical blocking between brands 60, 70, 80 and 90. Another attribute (e.g., size) determines the horizontal boundaries between the groups to ensure the items with smaller attribute value are placed above items with higher value. For example, smaller cans may be required to be placed above bigger cans.

Other placement and assortment rules in one embodiment may include the list of mandatory items that cannot be dropped out of assortment, all-or-nothing items that can be dropped out of assortment only together, limited selection item groups with given min/max number of items to be present in the assortment, equal number of facings item groups that have to be placed with the same number of facings, and item groups that have to be placed on the same shelves.

In one embodiment, the solution to the problem (i.e., the optimized shelf space product placement determination) is the decision as to whether to keep the item or to take it out of the assortment, and in the former case the number of its facings and shelf location. Therefore, since each item cannot be placed on more than one shelf, embodiments generate two sets of decisions: (1) the shelf the item should be assigned; and (2) the number of its facings.

One embodiment has an optimization objective of maximizing one of the KPIs such as sales volume, revenue, profit margin etc. For the purpose of formulating the optimization problem, it is assumed in one embodiment that all KPIs are functions of sales volume, with known user-defined parameters such as the price and the cost of an item. The sales volume of each item is considered to be a function of the number of facings and shelf assignment, which is given as part of the input. When an item is taken out of the assortment, its associated sales volume and generated revenue are assumed to be partially transferred to other similar items in the assortment.

In one embodiment, the following constraints are considered as inputs to the optimization problem:
Usable Shelf Capacity
This is a hard constraint based on the shelf length.
Attribute-Based Blocking and General Visual Guidance
This constraint forces items that share the same attribute value (e.g., brand or size) to be placed together in the block defined by vertical or horizontal boundaries. It is also assumed that there is a certain tolerance associated with violating vertical block alignment.
Assortment-Based Group Constraints
These constraints include mandatory items and all-or-nothing groups.
Placement Constraints
A group of items can be requested to be placed on the same shelf ("same shelf" constraint). Alternatively, constraints limit the shelves on which certain items can be placed or their min/max number of facings. Another type of placement constraint ensures the same number of facings for several items in a pre-defined group.
Shelf Uniqueness
An item can be assigned only to a single shelf.

In one embodiment, input data in addition to the constraints is received by system 10 of FIG. 1 in order to determine the optimized shelf space product placement. The data may be stored in database 17 of FIG. 1, or remotely from system 10. The data may include the following:
Assortment information:
  List of items together with their attributes and prices;
  Items that are allowed to be dropped from the assortment;
  Groups of items that are allowed to be dropped only together and choose-from item groups and their attributes; and
  Cumulative demand transference from the dropped item, which is computed as total increase in the objective function value due to demand transfer to other items when the given item is taken out of assortment.
Per item/per shelf: min/max number of facings, inter-item spacing (default=0).
Number of shelves and their length.
Item-to-shelf assignment restrictions:
  Per-item: which shelves the item is allowed to be placed; and
  Per-item-group: place-together group list and shelf restrictions (if any).
Per-item, per-shelf, per number of facings: expected sales volume and total facing width.
Merchandise attribute-based blocking rules and attribute-based spacing.

The following are input decision variables used in one embodiment, where the attribute-based blocking is defined as brand-based blocking. However, embodiments can used any other item attribute without loss of generality. The input decision variable are as follows:

Input Decision Variables $n$=number of shelves (two shelves in different fixtures are considered different);

m=number of items;
$L_j$=length of shelf j;
$S_i$=set of shelves allowed for placing product i;
$T=\{T_1, T_2, \ldots\}$ set of item groups to be kept together on the same shelf;
$G=\{G_1, G_2, \ldots\}$ set or item groups that have the same number of facings;
B=ordered set of brands (or other attribute-based vertically blocked subsets);
$b=\{i_1, i_2, \ldots\}$ set of items in brand $b \in B$;
$w_{ik}$=total width taken by k facings of item i (normally, $w_{ik}$=inter-item_space+facing_width*k);
$v_{ij}^k$=sales volume for item i when it is placed on shelf j with k facings (obtained from sales volume calculation procedure);
$K_{ij}$=set of allowed number of facings for item i on shelf j;
$k_s^{min}$, $k_s^{max}$=min/max number of items in "select subset" set s;
pi and $c_i$=price and cost of item i;
$g_i$=total revenue gain due to demand transference when item i is dropped from the assortment (assuming demand transference matrix $t_{ij}$ is given, it can be computed as $g_i=\Sigma_j p_j t_{ij}$);
$W_b$=desired width for brand b or other attribute-based group vertical blocking;
$\epsilon_b$=tolerance for brand b or other attribute-based group vertical blocking;
$l_p$=item sets to be blocked horizontally (one above the other).

Figure 3:
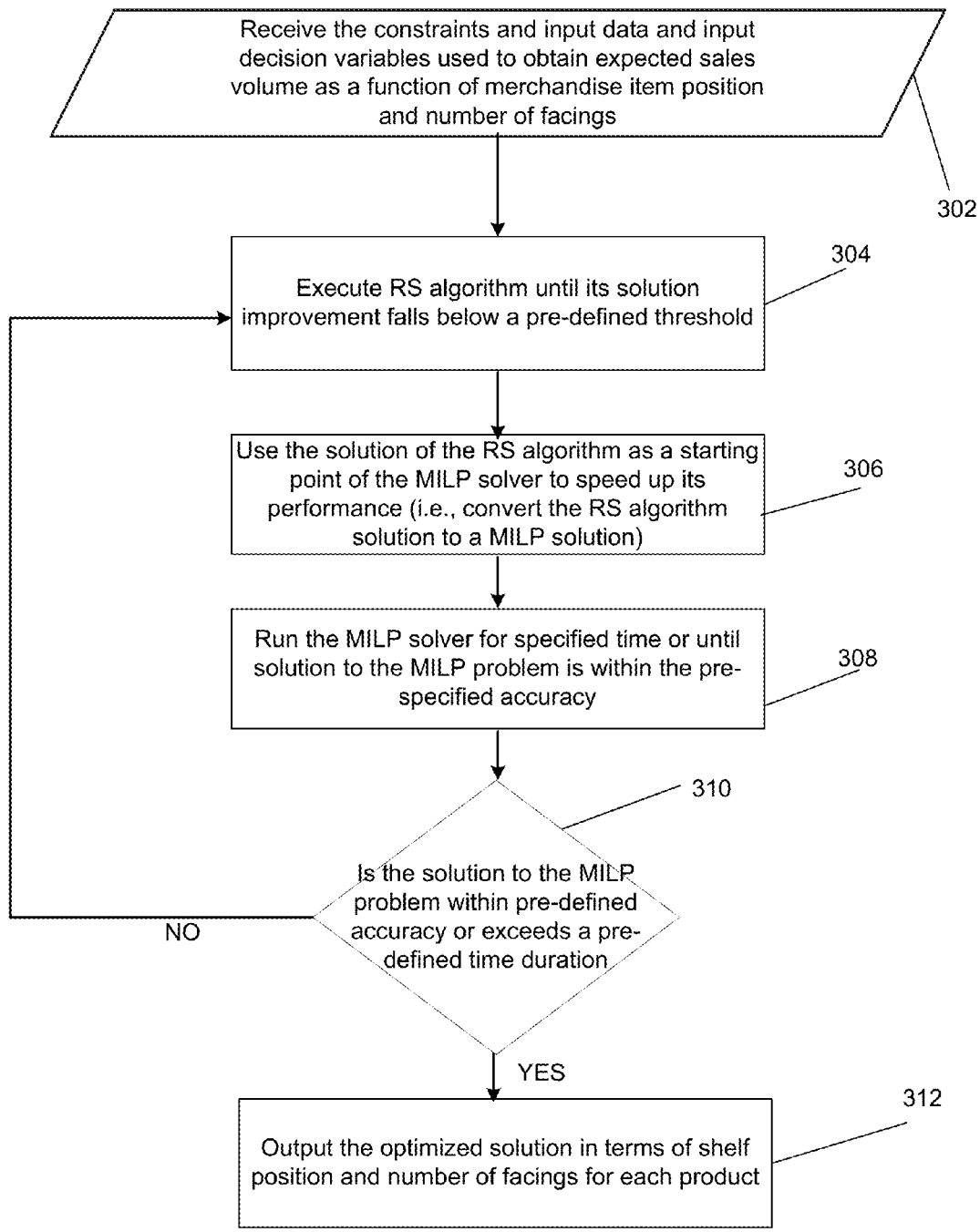
FIG. 3 is a flow diagram of the functionality of the shelf space product placement optimization module of FIG. 1 when optimizing shelf space product placement in accordance with one embodiment.

One embodiment provides shelf space product placement optimization by alternating between a Randomized Search ("RS") heuristic and formulating and solving the problem as Mixed-Integer Linear Program ("MILP") using any commercially available third party MILP solver. FIG. 3 is a flow diagram of the functionality of shelf space product placement optimization module 16 of FIG. 1 when optimizing shelf space product placement in accordance with one embodiment. In one embodiment, the functionality of the flow diagram of FIG. 3, and FIGS. 5-10 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, the constraints, input data and input decision variables used to obtain expected sales volume as a function of merchandise item position and number of facings, as disclosed above, is received.

At 304, using the decision variables, the RS algorithm is executed until its solution improvement falls below a pre-defined threshold. Additional details about the RS algorithm is disclosed below. In one embodiment, the pre-defined threshold is 0.8.

At 306, the solution of the RS algorithm is used as starting point of a MILP solver to speed up its performance. In other words, the RS algorithm solution is converted to a MILP solution. As disclosed in detail below, this includes transforming the RS algorithm solution into variables of the MILP formulation problem. Once this is done, the MILP problem can be solved by any widely available and known MILP solver.

At 308, the MILP solver is run for a specified time (e.g., run for one minute) or until the solution to the MILP problem is within the pre-specified accuracy (e.g., within 1% of the optimal solution).

At 310, it is determined whether the solution to the MILP problem is within pre-defined accuracy (e.g., within 1%) or exceeds a total running pre-defined time duration (e.g., 10 minutes). If no at 310, the functionality continues at 304 where the MILP solution is converted to the corresponding equivalent solution to start the RS algorithm by setting its decision variables based on the MILP solution, as disclosed in detail below.

If yes at 310, at 312 the optimized solution in terms of shelf position and number of facings for each product is output.

As discussed above, at 306 the decision variables from the RS algorithm are used to formulate the MILP. The MILP formulation is as follows:

MILP Formulation

Variables
Decision variables $$x_{ij}^k = \begin{cases} 1 & \text{if item } i \text{ is placed on shelf } j \text{ with } k \text{ facings and } k \in K_{ij} \\ 0, & \text{otherwise} \end{cases}$$

Auxiliary variables $$y_{ij} = \begin{cases} 1 & \text{if } j \in S_i(\text{per } LC11) \text{ and item } i \text{ is placed on shelf } j \\ 0, & \text{otherwise} \end{cases} \Rightarrow \forall i, j: \sum_{k \in K_{ij}} x_{ij}^k = y_{ij}$$

$$z_i = \begin{cases} 1 & \text{if item } i \text{ is dropped from the assortment} \\ 0, & \text{otherwise} \end{cases}$$

$$Z_A = \begin{cases} 1 & \text{if all items in group } A \text{ are dropped;} \\ 0 & \text{if none of them is dropped} \end{cases};$$

$$t_b^f = \begin{cases} 1 & \text{if the right boundary of brand } b \text{ is within fixture } f; \\ 0 & \text{if none of them is dropped} \end{cases};$$

Constraints
Mandatory items: $\forall i \in \text{MandatorySet}: z_i=0$
Limited Selection: $\forall s \in \text{SelectSubsetSet}: k_s^{min} \leq \Sigma_{i \in s}(1-z_i) \leq k_s^{max}$
All-or-nothing: $\forall A \in \text{AllOrNothing}: \Sigma_{i \in A} z_i = -|A|*Z_A$
Unique assignment:

$$\forall i: z_i + \sum_{j=1}^{n} \sum_{k} x_{ij}^k = 1$$

Equal number of facings (all items in each group $G_l \in G$ to have the same number of facings):

$$\forall\, G_\ell \in G : \forall\, i \in G_\ell : \sum_{j=1}^{n} \sum_{k \in K_{ij}} k x_{ij}^k = k_\ell$$

Same shelf (keep all products in $T_k \in T$ on the same shelf):

$$\forall\, T_k \in T\, \forall\, i \in T_k,\, \forall\, j : y_{ij} = u_{kj}$$

$$\forall\, T_k \in T : \sum_{j=1}^{n} u_{kj} \le 1$$

Vertical blocking:

$$\forall\, b \in B : \forall\, i \in b : \forall\, j = 1, \ldots, n : h_b - \varepsilon_b \le \sum_{b'=1}^{b} \sum_{i \in b'} \sum_{k \in K_{ij}} w_{ik} x_{ij}^k \le h_b$$

$$h_{|B|} \le \min_j L_j$$

Horizontal blocking: Suppose two product sets $I_1$ and $I_2$ have to be horizontally blocked one above the other. For example, $I_1$ may contain items of small size and $I_2$ may contain items of large size and small size items have to be placed on upper shelves whereas large size items have to placed on lower shelves. However, it may not be known in advance which shelves are assigned to large items and which shelves are assigned to small items. Assume that shelves are numbered from top to bottom. The following constraints therefore ensure the horizontal blocking:

$$\forall\, i_1 \in I_1,\, i_2 \in I_2 : \sum_{j=1}^{n} j y_{i_1 j} \le \sum_{j=1}^{n} j y_{i_2 j}$$

Objective

The objective below is for revenue maximization. Objectives for margin and volume are obtained similarly by replacing $p_i$ with $(p_i - c_i)$ or 1.

$$\max \sum_{i=1}^{m} \left( g_i z_i + \sum_{j=1}^{n} \sum_{k \in K_{ij}} (p_i v_{ij}^k - \lambda_{ij}^k) x_{ij}^k \right)$$

The solution to the above MILP problem can be obtained by solving it with any known commercial MILP solver "from scratch". Alternatively, it can be obtained by solving it with an RS solver and converting to the MILP solution following the procedure disclosed in more detail below.

Figure 4:
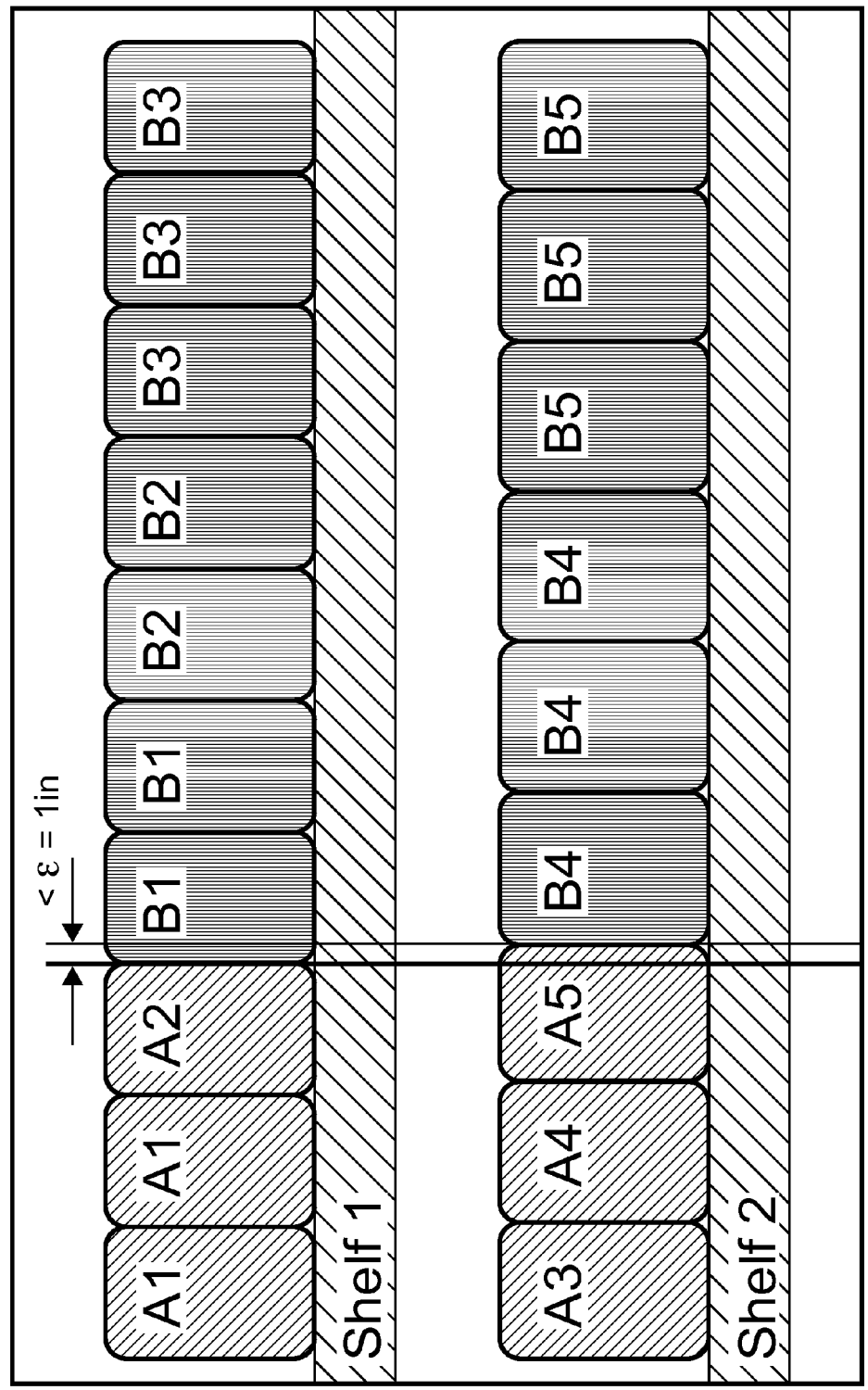
FIG. 4 is an example of a shelf space product placement optimized solution generated by an embodiment of the present invention.

FIG. 4 is an example of a shelf space product placement optimized solution generated by an embodiment of the present invention. In FIG. 4, five "brand A" products A1-5 and five brand B products B1-5 are to be placed on two shelves (Shelf 1 and 2) to satisfy brand-based vertical blocking with a small tolerance $\epsilon=1$ in. If brand A items are mandatory but of low price and low demand resulting in low revenue, then without the vertical blocking requirement, a single facing of each of these items would be optimal. However, in order to satisfy the vertical blocking constraint, and as a result of the output of the optimizer of embodiments of the present invention, a second facing of item A1 is added, which pushes the row of brand B on Shelf 1 to the right and lines it up with brand B on Shelf 2. As discussed, the output of the optimizer of embodiments of the invention provide both the placement of the items on the shelf as well as the number of facings.

Conversion of the RS Solution to the Equivalent Solution of the MILP Problem

As disclosed in conjunction with 306 of FIG. 3, after a solution to the shelf optimization problem is obtained using the RS algorithm, it is converted to the corresponding equivalent solution of the MILP problem by assigning certain values to the MILP variables as follows:

Denote RS decision variables defining the RS solution as follows:

For each item i:
  $j_i$, index of the shelf the item assigned to;
  $k_i$, the number of facings;
  if $k_i=0$, the item is dropped from the assortment and $j_i$ is undefined.

Given these RS decision variables, the MILP variables defining a feasible solution are obtained as follows:

For each shelf j:
  For each item i:
    If ($k_i==0$) $z_i=1$; else $z_i=0$;
    If ($j==j_i$) $y_{ij}=1$; else $y_{ij}=0$;
    For each allowed number of facings $k \in K_{ij}$:
      If($k==k_i$ and $j==j_i$) $x_{ij}^k=1$; else $x_{ij}^k=0$;

For each all-or-nothing item group A:
  For any item $i \in A$: $Z_A=z_i$;/* all $z_i$ variables are the same in this group */

For each keep-together item group $T_k \in T$:
  For any item $i \in T_k$:
    For each shelf j:
      If ($j==j_i$) $u_{kj}=1$; else $u_{kj}=0$ For each the-same-number-of-facings group $G_l \in G$:
  For any item $i \in G_l$: number of facings for group $G_l$, $k_l = k_i$ For each brand (or other attribute-based group) $b \in B$:

$$h_b = \max_j \sum_{b'=1}^{b} \sum_{i \in b'} w_{ik} x_{ij}^k$$

Conversion of the MILP Problem Solution to an Equivalent Solution for Starting the RS Algorithm As disclosed in conjunction with 310 of FIG. 3, after a solution to the shelf optimization problem is obtained by solving the MILP problem and the solution does not conform to the pre-specified accuracy, it is converted to the corresponding equivalent solution to start the RS algorithm by setting its decision variables based on the MILP solution as follows, using the above-defined MILP decision variables RS decision variables:

---

For each item i:
  If ($z_i == 1$) $k_i = 0$, $j_i$ is undefined (the item is not in the assortment);
  Else
    For each shelf j:
      For each allowed number of facings $k \in K_{ij}$:
        If ($x_{ij}^k = 1$) $j_i = j$; $k_i = k$

RS Algorithm

FIGS. 5-10 are flow diagrams of the functionality of shelf space product placement optimization module 16 of FIG. 1 to implement the RS algorithm when optimizing shelf space product placement in accordance with one embodiment. The RS algorithm is executed at 304 of FIG. 3.

Figure 5:
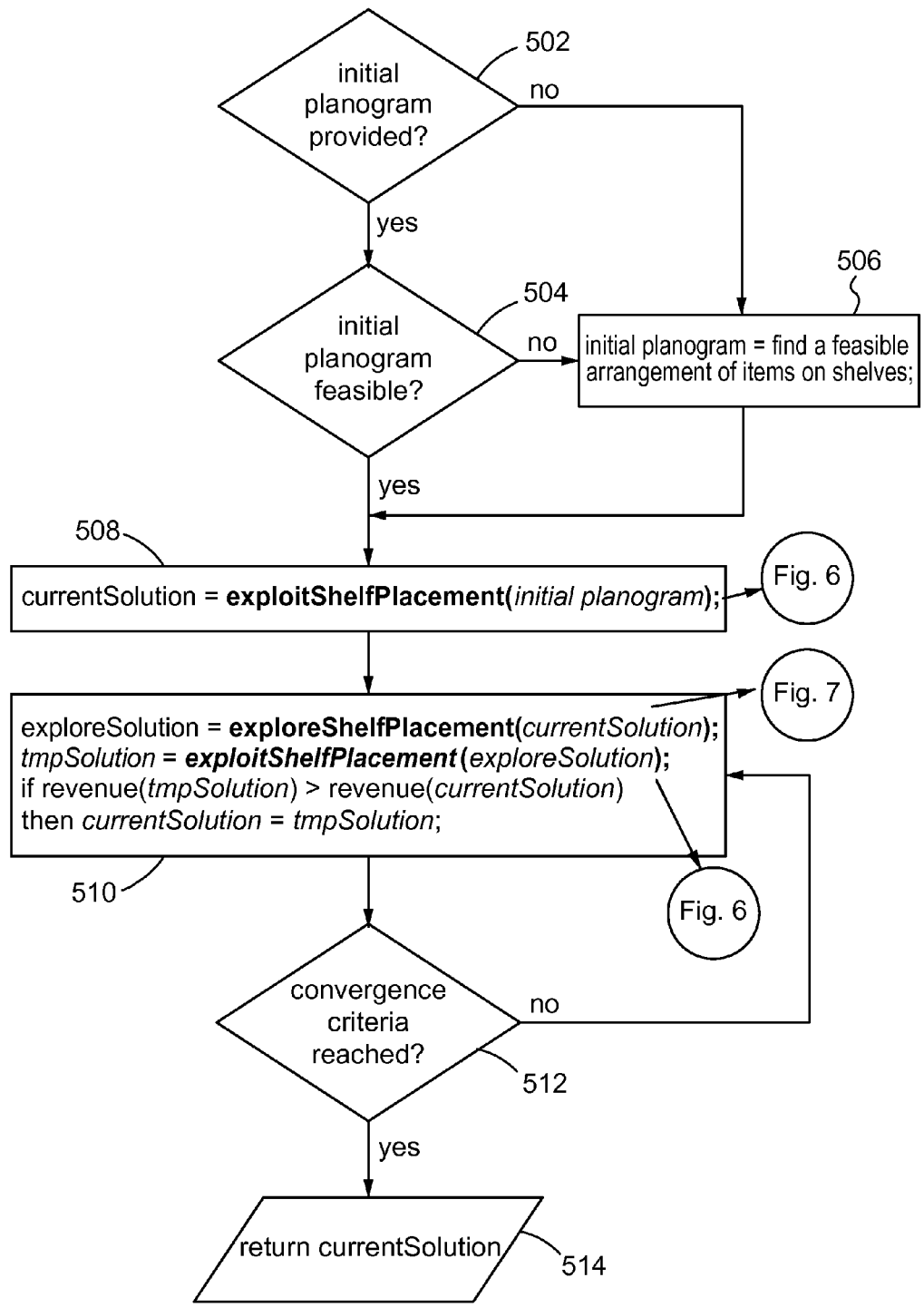
FIG. 5 is the overall functionality of solving the product placement optimization problem using the RS algorithm.

FIG. 5 is the overall functionality of solving the product placement optimization problem using the RS algorithm. At 502, it is determined if the initial planogram is provided. If no, at 506 the initial planogram is set as a feasible arrangement of the items on the shelves.

If yes at 502, at 504 it is determined if the initial planogram is feasible. If no, functionality continues at 506.

If yes at 504, at 508 the "currentSolution" variable is set as the function "exploitShelfPlacement" with the input of the "initial planogram" variable from 504. The "exploitShelfPlacement" function is disclosed in detail in FIG. 6.

At 510, the "exploreSolution" variable is set as a function of "exploreShelfPlacement" with the input of the "currentSolution" of 508. The "exploreShelfPlacement" function is disclosed in detail in FIG. 7. Further, a "tmpSolution" variable is set as the function "exploitShelfPlacement" with the input of the "exploreSolution" variable. If the revenue (or any other selected KPI) of the store is greater with tmpSolution than with currentSolution, then currentSolution=tmpSolution. Revenue (or any other selected KPI) is re-calculated every time the shelf position and/or number of facings of item are changed. The expression for the revenue is provided as the objective of the MILP formulation described above.

At 512, it is determined if a convergence criteria is reached, which in one embodiment is reached when there is no KPI improvement for the last two iterations. If no at 512, the functionality continues at 510. If yes at 512, the currentSolution is the optimized output of the placement of the items on the shelf or is used at the starting point for the MILP solver as disclosed at 306 of FIG. 3.

Figure 6:
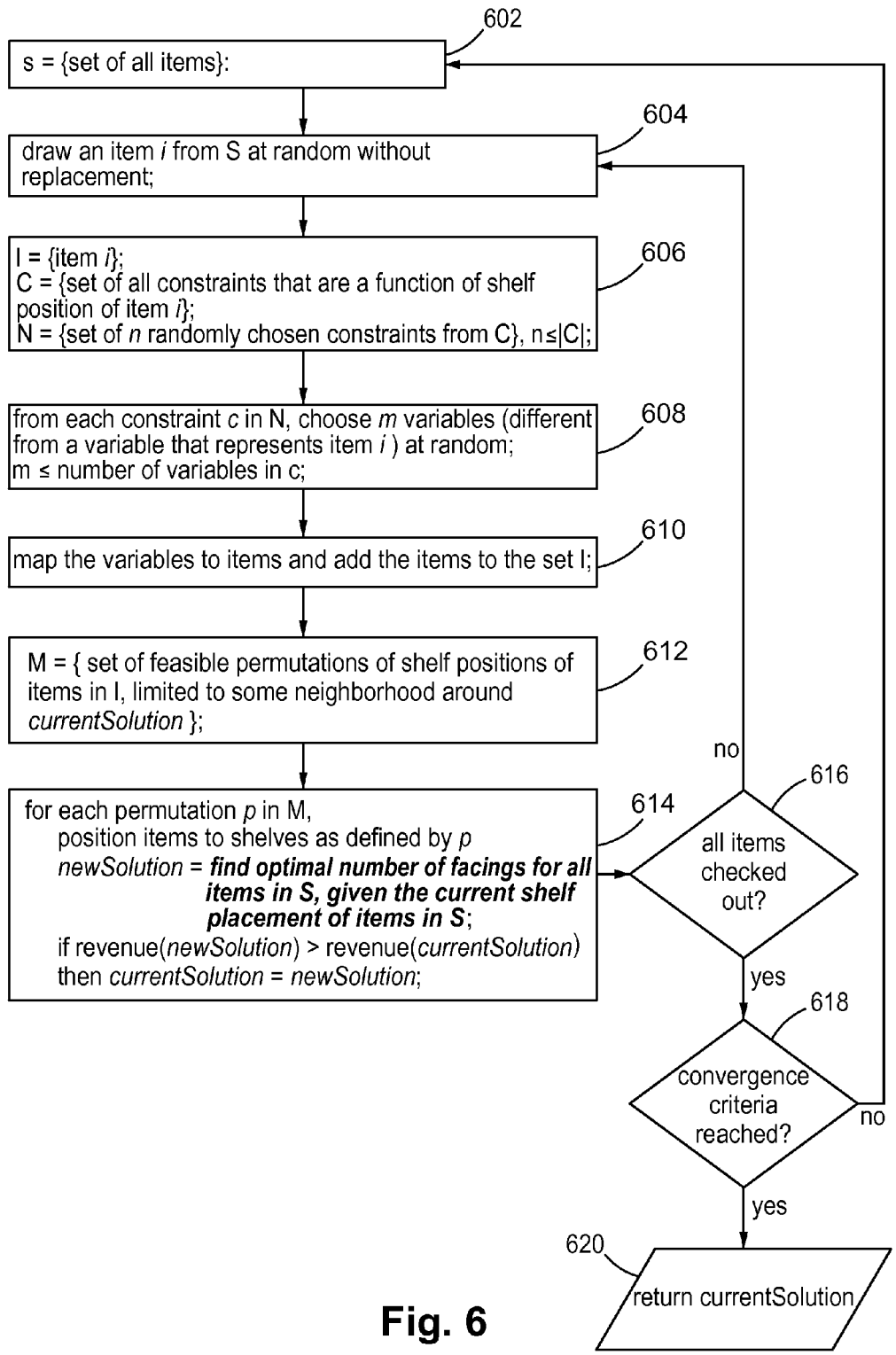
FIG. 6 is a flow diagram of the "exploitShelfPlacement" function with an input of "currentSolution" in accordance with one embodiment.

FIG. 6 is a flow diagram of the "exploitShelfPlacement" function with an input of "currentSolution" in accordance with one embodiment.

At 602, S={set of all items}.

At 604, an item i is drawn from S at random without replacement.

At 606, I={item i}; C={set of all constraints that are a function of shelf position of item i}; and N={set of n randomly chosen constraints from C}, n≤|C|.

At 608, from each constraint c in N, m variables (different from a variable that represents item i) are chosen at random; and m≤number of variables in c.

At 610, the variables are mapped to items and the items are added to the set I.

At 612, M={set of feasible permutations of shelf positions of items in I, limited to some neighborhood around currentSolution}.

At 614, for each permutation p in M, position items to shelves as defined by p; "newSolution"=find optimal number of facings for all items in S, given the current shelf placement of items in S; if revenue(newSolution)>revenue(currentSolution) then currentSolution=newSolution.

At 616, it is determined if all items are checked out. If no, functionality continues at 604.

If yes at 616, at 618 it is determined if a convergence criteria has been reached. If no, functionality continues at 602. If yes at 618, at 620 the new "currentSolution" is returned.

Figure 7:
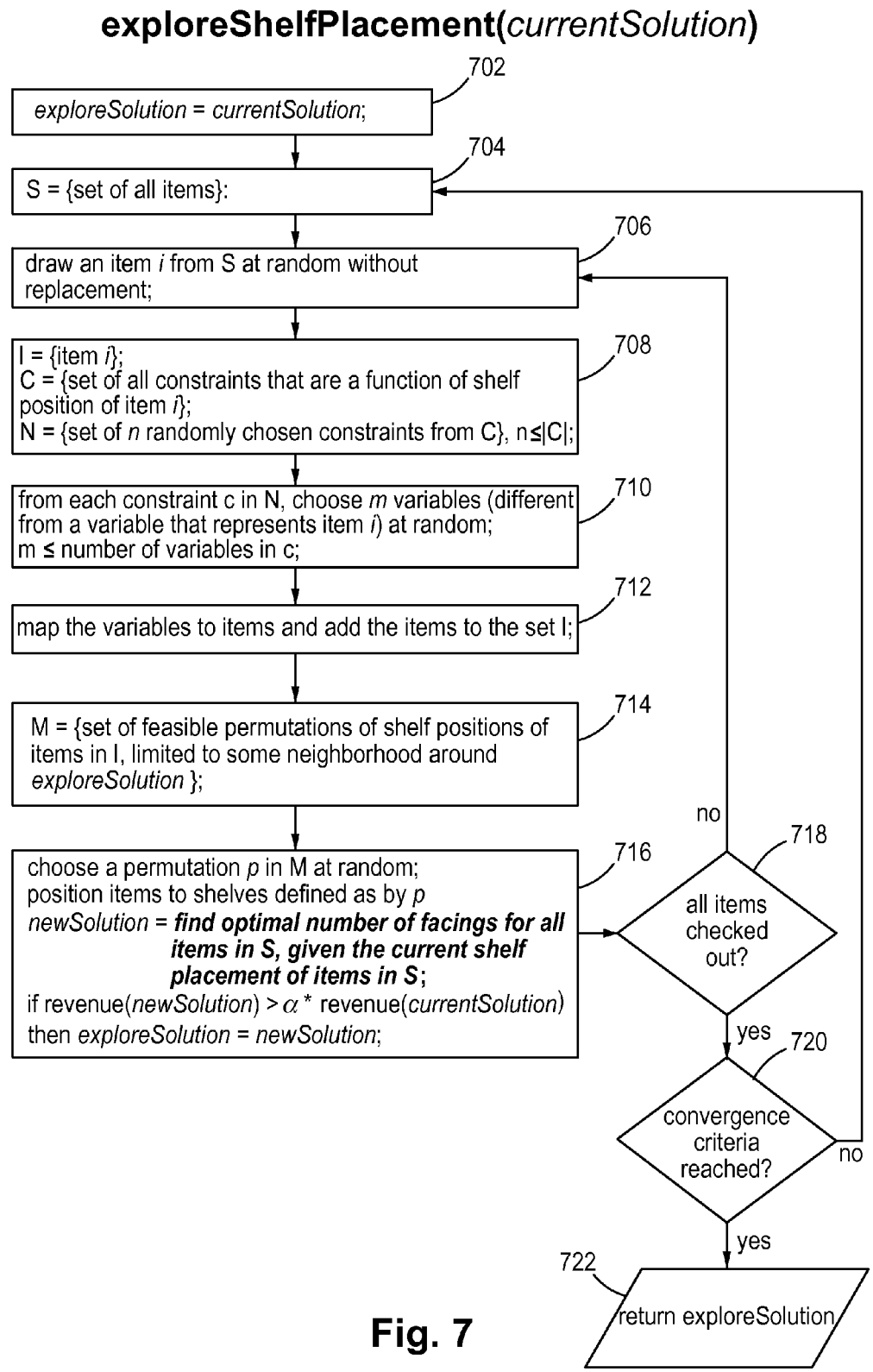
FIG. 7 is a flow diagram of the "exploreShelfPlacement" function with an input of "currentSolution" in accordance with one embodiment.

FIG. 7 is a flow diagram of the "exploreShelfPlacement" function with an input of "currentSolution" in accordance with one embodiment.

At 702, "exploreSolution"="currentSolution".

At 704, S={set of all items}.

At 706, an item i is drawn from S at random without replacement.

At 708, I={item i}; C={set of all constraints that are a function of shelf position of item i}; and N={set of n randomly chosen constraints from C}, n≤|C|.

At 710, from each constraint c in N, m variables (different from a variable that represents item i) are chosen at random; and m≤number of variables in c.

At 712, the variables are mapped to items and the items are added to the set I.

At 714, M={set of feasible permutations of shelf positions of items in I, limited to some neighborhood around exploreSolution}.

At 716, a permutation p in M is chosen at random, position items to shelves as defined by p; "newSolution"=find optimal number of facings for all items in S, given the current shelf placement of items in S; if revenue(newSolution)>$\alpha$*revenue (currentSolution) then exploreSolution=newSolution.

At 718, it is determined if all items are checked out. If no, functionality continues at 706.

If yes at 718, at 720 it is determined if a convergence criteria has been reached. If no, functionality continues at 704. If yes at 720, at 722 the new "exploreSolution" is returned.

Figure 8:
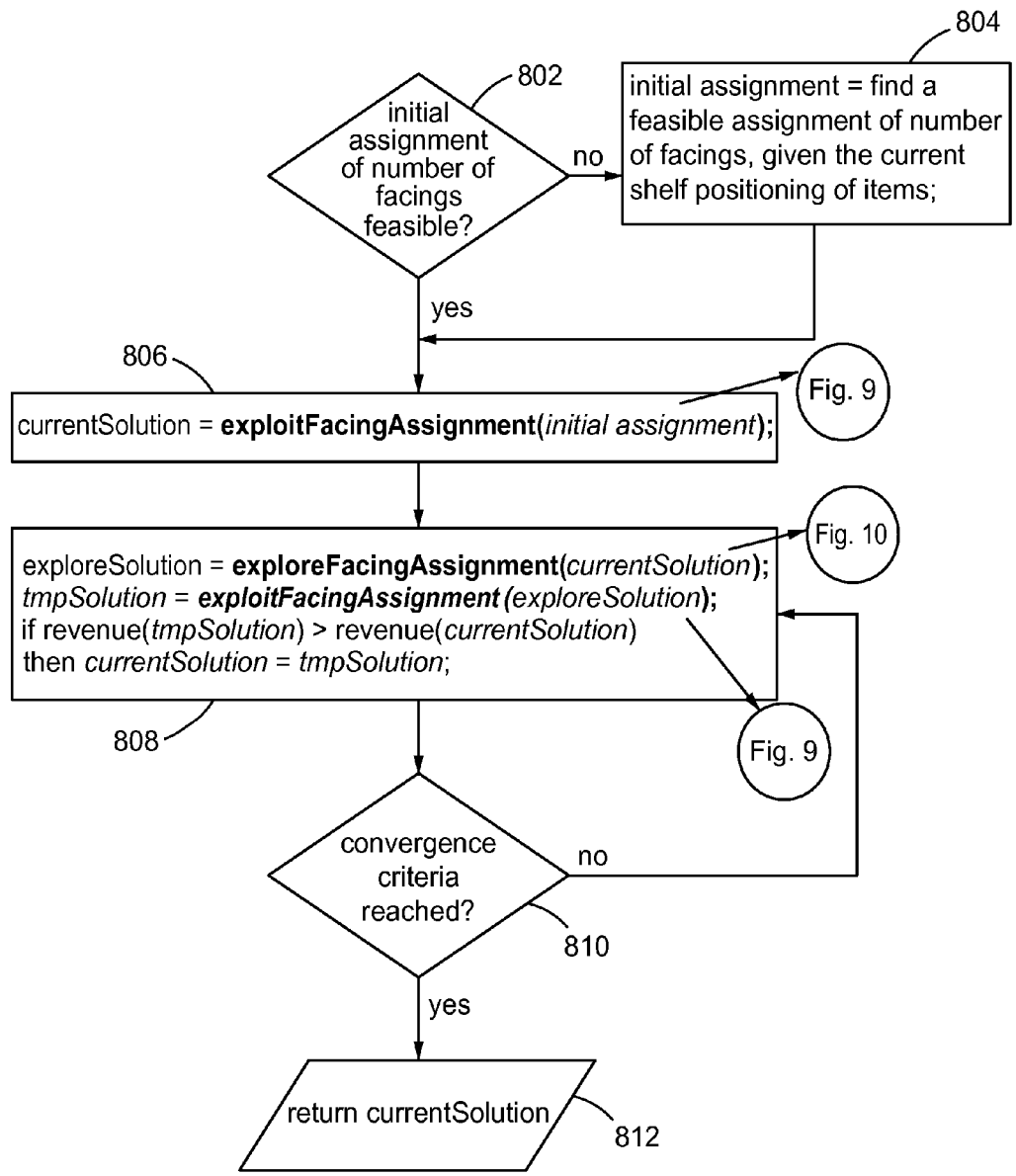
FIG. 8 is the overall functionality for finding the optimal number of facings for each item given the current shelf of the items from FIG. 5 using the RS algorithm in accordance with one embodiment.

FIG. 8 is the overall functionality for finding the optimal number of facings for each item given the current shelf of the items from FIG. 5 using the RS algorithm in accordance with one embodiment.

At 802, it is determined if the initial assignment of the number of facings is feasible. If no, functionality continues at 804. At 804, the initial assignment=find a feasible assignment of number of facings, given the current shelf positioning of items.

If yes at 802, at 806 the "currentSolution" variable is set as the function "exploitFacingAssignment" with the input of the "initial assignment" variable from 802 or 804. The "exploitFacingAssignment" function is disclosed in detail in FIG. 9.

At 808, the "exploreSolution" variable is set as a function of "exploreFacingAssignment" with the input of the "currentSolution" of 806. The "exploreFacingAssignment" function is disclosed in detail in FIG. 10. Further, a "tmpSolution" variable is set as the function "exploitFacingAssignment" with the input of the "exploreSolution" variable. If the revenue (or any other selected KPI) of the store is greater with tmpSolution than with currentSolution, then currentSolution=tmpSolution.

At 810, it is determined if a convergence criteria is reached, which in one embodiment is reached when there is no KPI improvement for the last two iterations. If no at 810, the functionality continues at 808. If yes at 810, the currentSolution is the optimized output of the number of facings for each item given the current shelf placement of the items on the shelf or is used at the starting point for the MILP solver as disclosed at 306 of FIG. 3.

Figure 9:
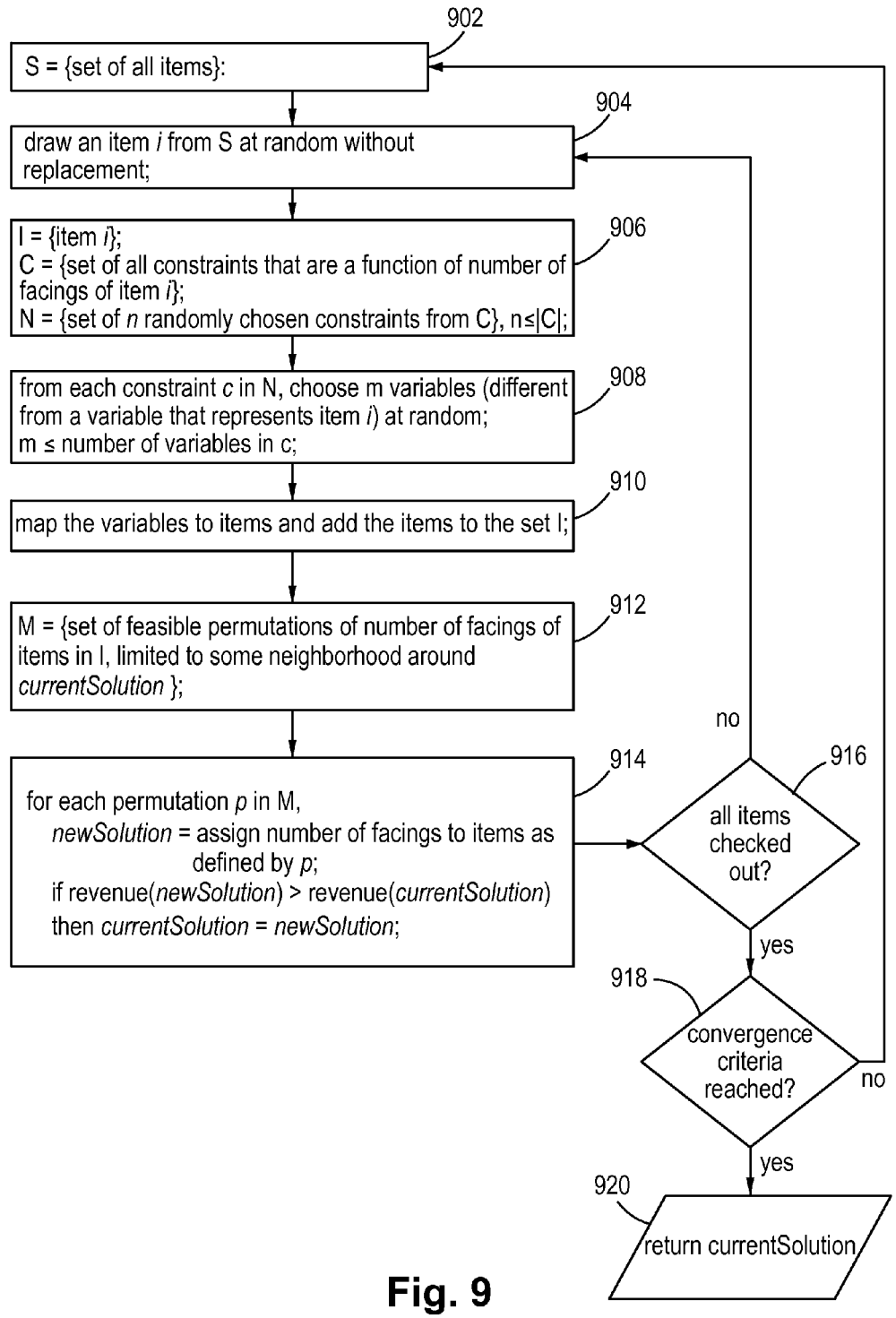
FIG. 9 is a flow diagram of the "exploitFacingAssignment" function with an input of "currentSolution" in accordance with one embodiment.

FIG. 9 is a flow diagram of the "exploitFacingAssignment" function with an input of "currentSolution" in accordance with one embodiment.

At 902, S={set of all items}.

At 904, an item i is drawn from S at random without replacement.

At 906, I={item i}; C={set of all constraints that are a function of number of facings of item i}; and N={set of n randomly chosen constraints from C}, n≤|C|.

At 908, from each constraint c in N, m variables (different from a variable that represents item i) are chosen at random; and m≤number of variables in c.

At 910, the variables are mapped to items and the items are added to the set I.

At 912, M={set of feasible permutations of number of facings of items in I, limited to some neighborhood around currentSolution}.

At 914, for each permutation p in M, newSolution=assign number of facings to items as defined by p; if revenue(newSolution)>revenue(currentSolution) then currentSolution=newSolution.

At 916, it is determined if all items are checked out. If no, functionality continues at 904.

If yes at 916, at 918 it is determined if a convergence criteria has been reached. If no, functionality continues at 902. If yes at 918, at 920 the new "currentSolution" is returned.

Figure 10:
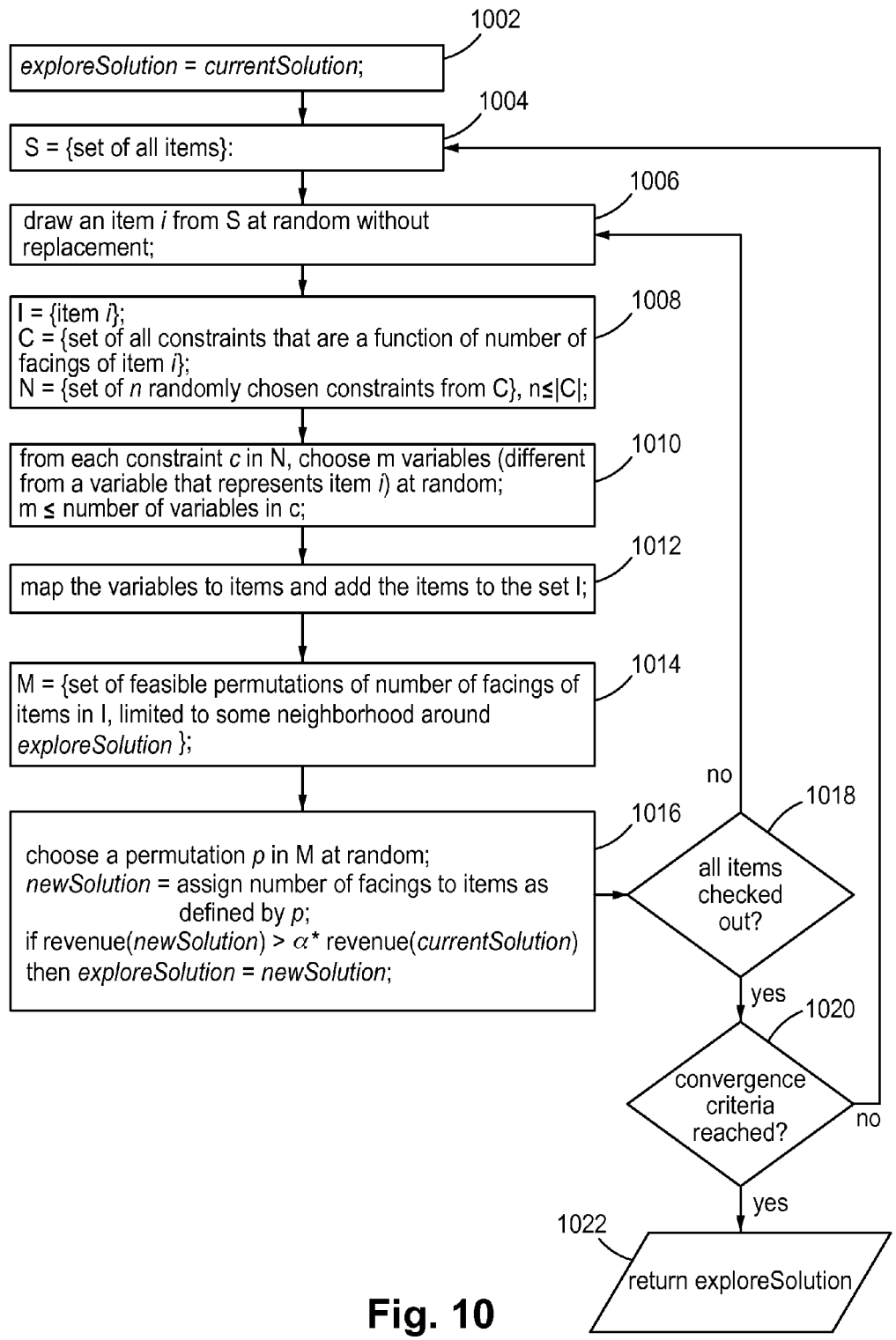
FIG. 10 is a flow diagram of the "exploreFacingAssignment" function with an input of "currentSolution" in accordance with one embodiment.

FIG. 10 is a flow diagram of the "exploreFacingAssignment" function with an input of "currentSolution" in accordance with one embodiment.

At 1002, "exploreSolution"="currentSolution".

At 1004, S={set of all items}.

At 1006, an item i is drawn from S at random without replacement.

At 1008, I={item i}; C={set of all constraints that are a function of the number of facings of item i}; and N={set of n randomly chosen constraints from C}, n≤|C|.

At 1010, from each constraint c in N, m variables (different from a variable that represents item i) are chosen at random; and m≤number of variables in c.

At 1012, the variables are mapped to items and the items are added to the set I.

At 1014, M={set of feasible permutations of number of facings of items in I, limited to some neighborhood around exploreSolution}.

At 1016, a permutation p in M is chosen at random, "newSolution"=assign number of facings to items as defined by p; if revenue(newSolution)>α*revenue(currentSolution) then exploreSolution=newSolution.

At 1018, it is determined if all items are checked out. If no, functionality continues at 1006.

If yes at 1018, at 1020 it is determined if a convergence criteria has been reached. If no, functionality continues at 1004. If yes at 1020, at 1022 the new "exploreSolution" is returned.

As disclosed, embodiments optimize shelf space placement by alternating between RS and MILP in order to determine, for a retail item, which shelf the item should be assigned and the number of its facings. The determination maximizes at least one of a key performance indicator ("KPI"), such as revenue, profit or sales volume.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-readable medium having instructions stored thereon that, when executed by a processor, cause the processor to optimize shelf space placement for a product, the optimization comprising:

receiving input decision variables and constraints;

executing a Randomized Search (RS) using the input decision variables and constraints until an RS solution is below a pre-determined improvement threshold, wherein the RS solution comprises first RS solution decision variables;

solving a Mixed-Integer Linear Program (MILP) problem using the first RS solution decision variables and constraints, wherein the RS solution is a starting point of the solving to generate a MILP solution by transforming the first RS solution decision variables into MILP decision variables;

when the MILP solution is not within a predetermined accuracy or does not exceed a predetermined time duration, alternating executing a second RS based on the previous MILP solution until a second RS solution comprising second RS solution decision variables is below the pre-determined improvement threshold and solving the MILP problem by transforming the second RS solution decision variables into MILP decision variables, until the MILP solution is within the predetermined accuracy or does exceed the predetermined time duration; and based on the MILP solution, outputting a shelf position and a number of facings for the product.

2. The computer-readable medium of claim 1, further comprising receiving for a store a set of products in a selected store area, wherein the output shelf position and the number of facings optimizes a key performance indicator for the store.

3. The computer-readable medium of claim 2, wherein the key performance indicator comprises at least one of revenue, profit or sales.

4. The computer-readable medium of claim 1, wherein the product comprises a vertical blocking attribute.

5. The computer-readable medium of claim 1, wherein the product comprises a horizontal boundary attribute.

6. The computer-readable medium of claim 1, wherein the constraints comprise at least one of: usable shelf capacity, attribute-based blocking, assortment-based group constraints, placement constraints or shelf uniqueness.

7. The computer-readable medium of claim 1, further comprising optimizing the shelf space placement for a plurality of products, wherein further outputting based on the MILP solution, for each of the plurality of products, whether to keep the product among a product assortment.

8. A computer-implemented method for optimize shelf space placement for an item in a store, the method comprising:

receiving input decision variables and constraints;

executing a Randomized Search (RS) using the input decision variables and the constraints until an RS solution is below a predetermined improvement threshold, wherein the RS solution comprises first RS solution decision variables;

solving a Mixed-Integer Linear Program (MILP) problem using the first RS solution decision variables and the constraints, wherein the RS solution is a starting point of the solving to generate a MILP solution by transforming the first RS solution decision variables into MILP decision variables;

when the MILP solution is not within a predetermined accuracy or does not exceed a predetermined time duration, alternating executing a second RS based on the previous MILP solution until a second RS solution comprising second RS solution decision variables is below the pre-determined improvement threshold and solving the MILP problem by transforming the second RS solution decision variables into MILP decision variables, until the MILP solution is within the predetermined accuracy or does exceed the predetermined time duration; and based on the MILP solution, outputting a shelf position and a number of facings for the item.

9. The computer-implemented method of claim 8, further comprising receiving for the store a set of items in a selected store area, wherein the output shelf position and the number of facings optimizes a key performance indicator for the store.

10. The computer-implemented method of claim 9, wherein the key performance indicator comprises at least one of revenue, profit or sales.

11. The computer-implemented method of claim 8, wherein the item comprises a vertical blocking attribute.

12. The computer-implemented method of claim 8, wherein the item comprises a horizontal boundary attribute.

13. The computer-implemented method of claim 8, wherein the constraints comprise at least one of: usable shelf capacity, attribute-based blocking, assortment-based group constraints, placement constraints or shelf uniqueness.

14. The computer-implemented method of claim 8, further comprising optimizing the shelf space placement for a plurality of items, wherein further outputting based on the MILP solution, for each of the plurality of items, whether to keep the item among an item assortment.

15. A shelf space product optimizer system that optimizes shelf space placement for a product in a store, the system comprising:
a processor;
a storage device coupled to the processor storing instructions that when executed by the processor implements system modules comprising:
a randomized searcher that receives input decision variables and constraints and executes Randomized Search (RS) using the input decision variables and constraints until an RS solution is below a predetermined improvement threshold, wherein the RS solution comprises first RS solution decision variables;
a Mixed-Integer Linear Program (MILP) solver that receives the RS solution when it is below the predetermined improvement threshold and solves a formulated MILP problem using the first RS solution decision variables and constraints, wherein the RS solution is a starting point of the solving to generate a MILP solution by transforming the first RS solution decision variables into MILP decision variables; and
a solution module that when the MILP solution is not within a predetermined accuracy or does not exceed a predetermined time duration, alternates executing a second RS based on the previous MILP solution until a second RS solution comprising second RS solution decision variables is below the pre-determined improvement threshold and solves the MILP problem by transforming the second RS solution decision variables into MILP decision variables, until the MILP solution is within the predetermined accuracy or does exceed the predetermined time duration, and based on a final MILP solution, outputs a shelf position and a number of facings for the product.

16. The system of claim 15, the randomized searcher further receiving for the store a set of products in a selected store area, wherein the output shelf position and the number of facings optimizes a key performance indicator for the store, and the key performance indicator comprises at least one of revenue, profit or sales.

17. The system of claim 15, wherein the product comprises a vertical blocking attribute.

18. The system of claim 15, wherein the product comprises a horizontal boundary attribute.

19. The system of claim 15, wherein the constraints comprise at least one of: usable shelf capacity, attribute-based blocking, assortment-based group constraints, placement constraints or shelf uniqueness.

20. The system of claim 15, wherein the MILP solver further comprises optimizing the shelf space placement for a plurality of products, wherein further outputting based on the MILP solution, for each of the plurality of products, whether to keep the product among a product assortment.

* * * * *

UNITED STATES PATENT AND TRADEMARK OFFICE
CERTIFICATE OF CORRECTION

PATENT NO. : 8,930,235 B2
APPLICATION NO. : 13/673347
DATED : January 6, 2015
INVENTOR(S) : Kresimir Mihic et al.

It is certified that error appears in the above-identified patent and that said Letters Patent is hereby corrected as shown below:

In the specification,

In column 6, line 48-50 (approx.), delete "$t_b^f = \begin{cases} 1 \text{ if the right boundary of brand } b \text{ is within fixture } f; \\ 0 \text{ if none of them dropped} \end{cases}$"

and insert --
$$t_b^f = \begin{cases} 1 \text{ if the right boundary of brand } b \text{ is within fixture } f; \\ 0, \text{otherwise} \end{cases}$$
$$h_b = \begin{cases} \text{distance from the left edge of the category to the right boundary of brand } b \\ 0, \text{otherwise} \end{cases}$$
$$k_\ell = \text{number of facings for group } G_\ell \in G;$$
$$u_{kj} = \begin{cases} 1 \text{ if item group } T_k \in T \text{ is assigned to shelf } j; \\ 0, \text{otherwise} \end{cases}$$
--, therefor.

In column 6, line 58 (approx.), delete "$-A| * Z_A$" and insert -- $|A| * Z_A$ --, therefor.

In column 6, line 62-63 (approx.), delete "$\forall i : z_i + \sum_{j=1}^{n} \sum_{k \in} x_{ij}^k = 1$" and insert $$\forall i : z_i + \sum_{j=1}^{n} \sum_{k \in K_{ij}} x_{ij}^k = 1$$

--, therefor.

Signed and Sealed this
Twenty-fourth Day of May, 2016

Michelle K. Lee
*Director of the United States Patent and Trademark Office*